US011093978B2

(12) United States Patent
Vasudevan et al.

(10) Patent No.: US 11,093,978 B2
(45) Date of Patent: Aug. 17, 2021

(54) CREATING DERIVATIVE ADVERTISEMENTS (71) Applicant: ARRIS Enterprises, Inc., Suwanee, GA (US)

(72) Inventors: Venugopal Vasudevan, Palatine, IL (US); Anthony J. Braskich, Palatine, IL (US); Renxiang Li, Lake Zurich, IL (US); Jehan Wickramasuriya, St. Charles, IL (US); Faisal Ishtiaq, Chicago, IL (US); Stephen P. Emeott, Rolling Meadows, IL (US); Benedito J. Fonseca, Jr., Glen Ellyn, IL (US); Alfonso Martinez Smith, Algonquin, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 27 days.

(21) Appl. No.: 14/482,368

(22) Filed: Sep. 10, 2014

(65) Prior Publication Data
US 2015/0073921 A1  Mar. 12, 2015

Related U.S. Application Data (60) Provisional application No. 61/875,693, filed on Sep. 10, 2013.

(51) Int. Cl.
*G06Q 30/02* (2012.01)
*H04N 21/854* (2011.01)
(Continued)

(52) U.S. Cl.
CPC ......... *G06Q 30/0276* (2013.01); *H04H 60/07* (2013.01); *H04H 60/375* (2013.01);
(Continued)

(58) Field of Classification Search
CPC ............... G06Q 30/00; G06Q 30/02
(Continued)

(56) References Cited

U.S. PATENT DOCUMENTS 6,658,662 B1   12/2003 Nielsen
7,020,336 B2   3/2006  Cohen-Solal et al.
(Continued)

FOREIGN PATENT DOCUMENTS

WO   2002071264        9/2002
WO   WO 2008/082733 A1 *  7/2008  ............. G06Q 30/00
(Continued)

OTHER PUBLICATIONS

H. Rehatschek; R. Sorschag; B. Rettenbacher; H. Zeiner; J. Nioche; F. DeJong; R. Ordelmann; D. Van Leeuwen, Mediacampaign—A multimodal semantic analysis system fro advertisement campaign detection (English), 2008 International Workshop on content-Based Multimedia Indexing (pp. 85-92), Jun. 1, 2008 (Year: 2008).*
(Continued)

*Primary Examiner* — Marilyn G Macasiano
(74) *Attorney, Agent, or Firm* — Buchanan Ingersoll & Rooney, PC (57) ABSTRACT A method for creating derivative advertisements is provided. The method includes identifying a visual element based on an analysis of a primary advertisement asset such that the visual element is representative of a branding message provided within the primary advertisement. The method also includes identifying a call-to-action (CTA) data element based on the analysis and creating a derivative advertisement asset having the visual element and CTA data element. A system and a non-transitory computer-readable storage medium containing software for executing the method are also provided.

19 Claims, 3 Drawing Sheets

(51) Int. Cl.
*H04N 21/81* (2011.01)
*H04N 21/24* (2011.01)
*H04H 60/73* (2008.01)
*H04H 60/80* (2008.01)
*H04H 60/56* (2008.01)
*H04H 60/07* (2008.01)
*H04H 60/63* (2008.01)
*H04H 60/37* (2008.01)

(52) U.S. Cl.
CPC ............ *H04H 60/56* (2013.01); *H04H 60/63* (2013.01); *H04H 60/73* (2013.01); *H04H 60/80* (2013.01); *H04N 21/2407* (2013.01); *H04N 21/812* (2013.01); *H04N 21/854* (2013.01)

(58) Field of Classification Search
USPC .............................................. 705/14.4, 14.73
See application file for complete search history.

(56) References Cited

U.S. PATENT DOCUMENTS

| | | | |
|---|---|---|---|
| 8,121,896 B1 | 2/2012 | Lagassey | |
| 8,321,887 B2 | 11/2012 | DuBose | |
| 2006/0015904 A1* | 1/2006 | Marcus | H04N 21/254 725/46 |
| 2010/0242063 A1* | 9/2010 | Slaney | G06Q 30/0241 725/32 |
| 2013/0073402 A1* | 3/2013 | Lerman | G06Q 30/0241 705/14.73 |
| 2013/0125156 A1 | 5/2013 | Shah | |
| 2013/0174188 A1 | 7/2013 | Gagnon et al. | |
| 2013/0179917 A1 | 7/2013 | Gu et al. | |
| 2016/0212502 A1* | 7/2016 | Marcus | H04N 7/16 |

FOREIGN PATENT DOCUMENTS

| | | | |
|---|---|---|---|
| WO | 2013040533 A1 | 3/2013 | |
| WO | WO 2014/179466 A1 * | 11/2014 | ............... G06K 9/00 |

OTHER PUBLICATIONS

Nathan Frey; Nestor Hernandez; Guannan Zhang; Jingbin Wang; Qifeng Tan; 7 other persons credited, Automated Advertisement Creation System, An IP.com Prior Art Database Technical Disclosure, Oct. 29, 2017 (Year: 2017).*
Hanson; Kevin; "Multi-Screen Advertising: Cross-Screen Engagement from TV to Mobile", Mad Mobile News; Mar. 26, 2013.
Official Action, Re: Canadian Application No. 2,924,071, dated Dec. 8, 2016.
PCT Search Report & Written Opinion, RE: Application No. PCT/US14/55014, dated Mar. 18, 2015.
Official Action, RE: Canadian Application No. 2,924,071, dated Feb. 5, 2018.
Official Action, Re: Canadian Application No. 2,924,071, dated Jan. 25, 2019.
Office Action dated Nov. 18, 2020, by the Canadian Intellectual Property Office in corresponding Canadian Patent Application No. 2,924,071. (6 pages).

* cited by examiner

CREATING DERIVATIVE ADVERTISEMENTS

CROSS REFERENCE TO RELATED APPLICATIONS

This application claims the benefit under 35 USC § 119(e) of U.S. Provisional Patent Application No. 61/875,693, filed Sep. 10, 2013.

BACKGROUND

Advertisements and advertising campaigns are typically created for video content that is displayed, for example, on a first device such as a television. For instance, such an advertisement may be a television commercial of about 30 to 60 seconds.

Such video content may be broadcast over a broad area, such as an entire country. However, regional affiliates may be responsible for the broadcast in various regions, such as in the northeast region, western region, etc. Each regional affiliate may offer local ad insertion, which allows different geographical areas to insert different local advertisements into the broad television broadcast. For example, a local ad for a local business may be inserted into a broadcast of video content on a specific channel.

Secondary devices, such as tablet devices, smartphones, etc., which may be used by some end users provide multi-screen advertising opportunities. For example, a second screen advertisement may be output in conjunction with an advertisement playing on the first screen. Conventionally, a corresponding advertisement or advertising campaign can be specially created (e.g., by a creative or advertising agency) that is adapted to be displayed, for example, on a "second screen" such as a computer, smartphone, tablet, or other display device having characteristics that are different from those of the first device. Local advertisers typically may not take advantage of second screen opportunities due to the difficulty in creating second screen advertisements and the cost and effort associated with creation of the second screen advertisements.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Aspects of the present disclosure describe systems and methods for creating a derivative advertisement using a primary advertisement. The derivative advertisement may be used as a second screen advertisement in a multi-screen advertising campaign.

Further aspects of the present disclosure describe illustrative embodiments of a system for managing second screen advertisements and a media analysis framework ("MAF") in which the foregoing aspects can be practiced.

System for Managing Second Screen Advertisements

In a multi-screen advertisement campaign, a first screen or primary advertisement may have a corresponding second screen advertisement. For example, a second screen advertisement may be output on a tablet device when the first screen advertisement is displayed. Particular embodiments may then monitor analytics for the second screen advertisement, such as a click-through rate and the like. These analytics may be correlated to the first screen advertisement.

Figure 1:
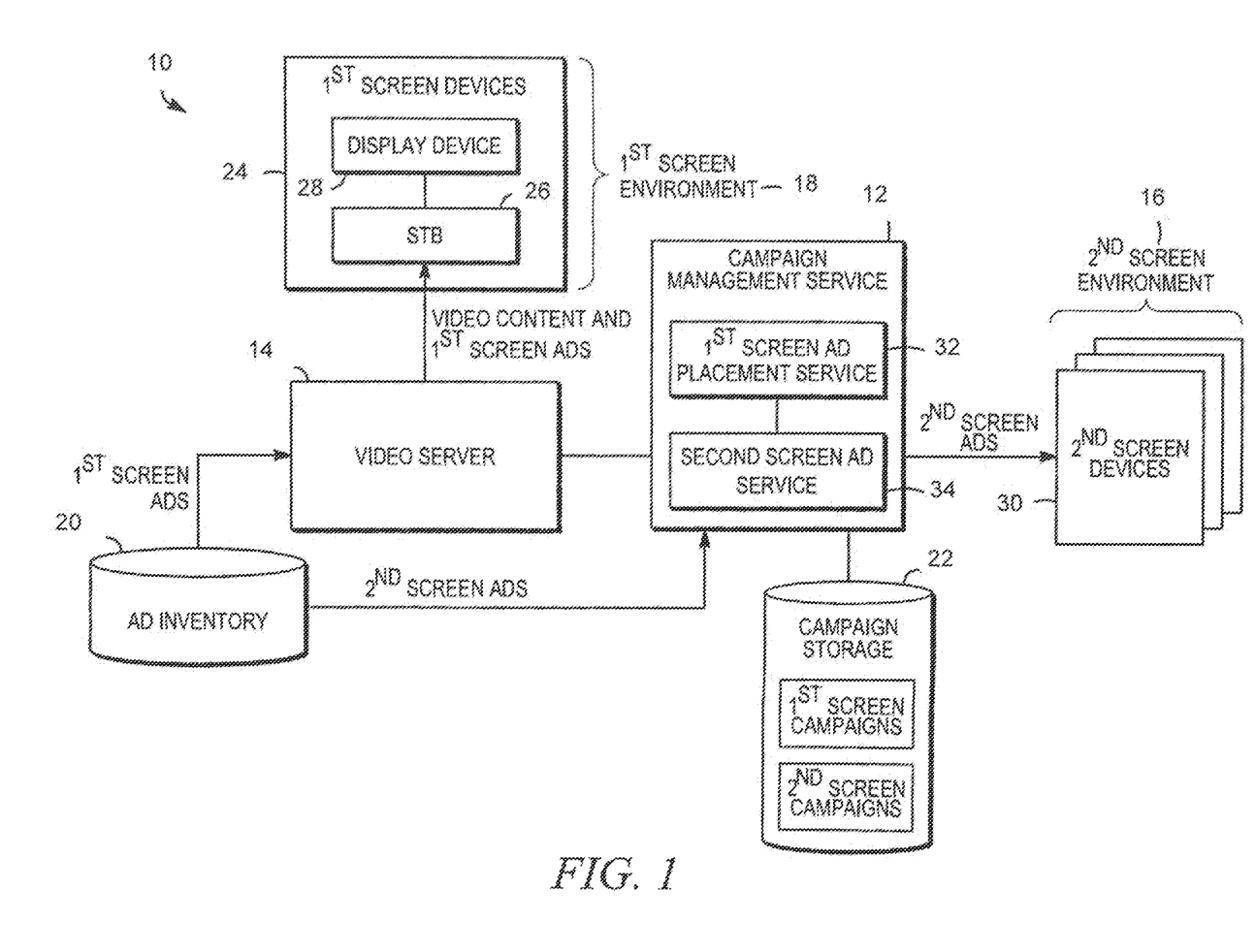
FIG. 1 depicts an example of a system for managing second screen advertisements according to an embodiment.

FIG. 1 depicts a system 10 for managing second screen advertisements according to an embodiment. System 10 includes a campaign management service 12, a video server 14, a second screen environment 16, a first screen environment 18, ad inventory storage 20, and ad campaign storage 22.

First screen environment 18 may include various first screen devices 24, such as a set top box (STB) 26 and a display device 28. Although the set top box 26 is described, other devices may be appreciated, such as cable modems, media terminal adapters, televisions equipped with set top boxes, and other customer premises equipment. Set top box 26 and display device 28 are configured to display video content and also advertising content received from video server 14. In one example, set top box 26 may dynamically insert local advertisements into ad slots during the linear delivery of video content, and in other cases video server 14 may insert local advertisements.

Typically, a local advertisement is associated with a certain targeted characteristic, such as a region, user, etc. In this case, the local advertisement may not be shown uniformly across the broad delivery of the video content. For example, a local advertisement in the northeast region of the United States may be different from a local advertisement in the southern region of the United States. Although local advertisements are described, it will be understood that particular embodiments may be used with other types of advertisements, such as broad based advertisements that are not targeted to a characteristic, or not locally targeted.

Second screen environment 16 may include second screen devices 30. As described above, second screen devices 30 may be different from first screen devices 24, and a user may use second screen devices 30 in conjunction with first screen devices 24. For example, a user may use a tablet device or smartphone while watching the video content on first screen device 24. Video server 14 and campaign management service 12 may be part of a video delivery platform, such as a multiple system operator (MSO), and includes various computing, storage, and transmission equipment to transmit the video to first screen environment 18 and second screen advertisements to second screen environment 16. As an example, the MSO may operate cable and/or direct broadcast satellite television systems.

In one embodiment, video server 14 delivers video content linearly to first screen environment 18. The linear delivery of content may be where programs are delivered at pre-scheduled times that they are offered. For example, particular channels may offer programs on a pre-set schedule. This content may be delivered linearly to first screen environment 18. In this case, users do not request the content on-demand. Although linear content delivery is described, it will be understood that certain forms of on-demand requesting of content may be appreciated and used in particular embodiments.

Campaign management service 12 may coordinate the display of first screen advertisements and second screen advertisements. In one example, campaign storage 22 may store characteristics about advertisement campaigns. These characteristics define how the first screen advertisements are included in video content delivery to first screen environment 18. Also, the characteristics may govern when second screen advertisements may be displayed.

Video server 10 may use a first screen ad placement service 32 to determine an advertisement to insert. First screen ad placement service 32 may be included in campaign management service 12 or may be a separate entity. For instance, the first screen ad placement service 32 may be part of an ad server or even video server 14. When the first screen ad placement service 32 selects an advertisement to be displayed in a particular ad slot, the video server 14 may then retrieve the first screen advertisement from ad inventory 20 and insert the first screen advertisement into the transport stream being sent to first screen environment 18. Set top box 26 may receive the first screen advertisement and display it on display device 28.

When the video server 14 delivers the video content, a second screen ad service 34 may monitor the transport stream for the delivery of the video content (e.g., a transport stream of the video content being delivered on a channel) to determine when and which first screen advertisements are inserted in the video content by video server 14. The second screen ad service 34 may be software that sits on top of first screen ad placement service 32 gaining access to the placement requests and responses going out and being executed by the video server 14. Second screen ad service 34 may also be located in other entities, such as video server 14 or a separate entity.

When the second screen ad service 34 receives an indication that the first screen advertisement with a corresponding second screen advertisement has been placed in the transport stream, second screen ad service 34 may send the corresponding second screen advertisement to a second screen device 30. For example, any users that have second screen devices enabled and are receiving the first screen advertisement may have a second screen advertisement delivered.

Accordingly, particular embodiments disclosed below in greater detail provide an automated manner to generate second screen advertisements in conjunction with first screen advertisements. In addition, the second screen ad service 34 may monitor second screen analytics derived with the delivery of the second screen advertisements to second screen devices 30. This may include the click-through rate or any other action that is performed for the second screen advertisements. The second screen analytics may then be correlated with the first screen advertisements and provided to advertisers. In this manner, an advertiser may be able to determine the effectiveness of second screen advertisements when the first screen advertisements have been delivered using the analytics information. Thus, advertisers may be able to correlate second-screen analytics and effectiveness with their first-screen campaigns, which extends the advertisers measurement capabilities, such as beyond television ratings.

According to an embodiment discussed in greater detail below, the second screen ad service 34 may provide a feedback loop to the first and second screen advertisements with this correlation of analytics. For example, insights gained via the effectiveness of second-screen campaigns could be fed back into the first and second screen campaigns such that the first and second screen campaigns can be adjusted accordingly. For example, if a particular aspect of a product is highlighted via a second-screen ad that ends up being effective (from a second-screen analytics and reporting standpoint), then the advertiser may choose to adjust their first and second screen ad assets accordingly (the asset itself, target demographic, time-slot it airs, etc.).

Media Analysis Framework

In generating a derivative advertisement from a primary advertisement such that the derivative advertisement may be used as a second screen advertisement as discussed above or the like, an embodiment includes analyzing the primary advertisement. For this purposes and with reference to FIG. 2, an illustrative architecture for implementation of a media analysis framework (also referred to herein as a media analyzer), for use in accordance with an embodiment, is depicted. Examples of embodiments of an architecture for implementation of a media analysis framework ("MAF") 100 include a system, for example, in accordance with the following detailed descriptions of a data plane 110, a control plane 120, a metadata plane 130, MAF services plane 140 and applications interface plane 150.

Figure 2:
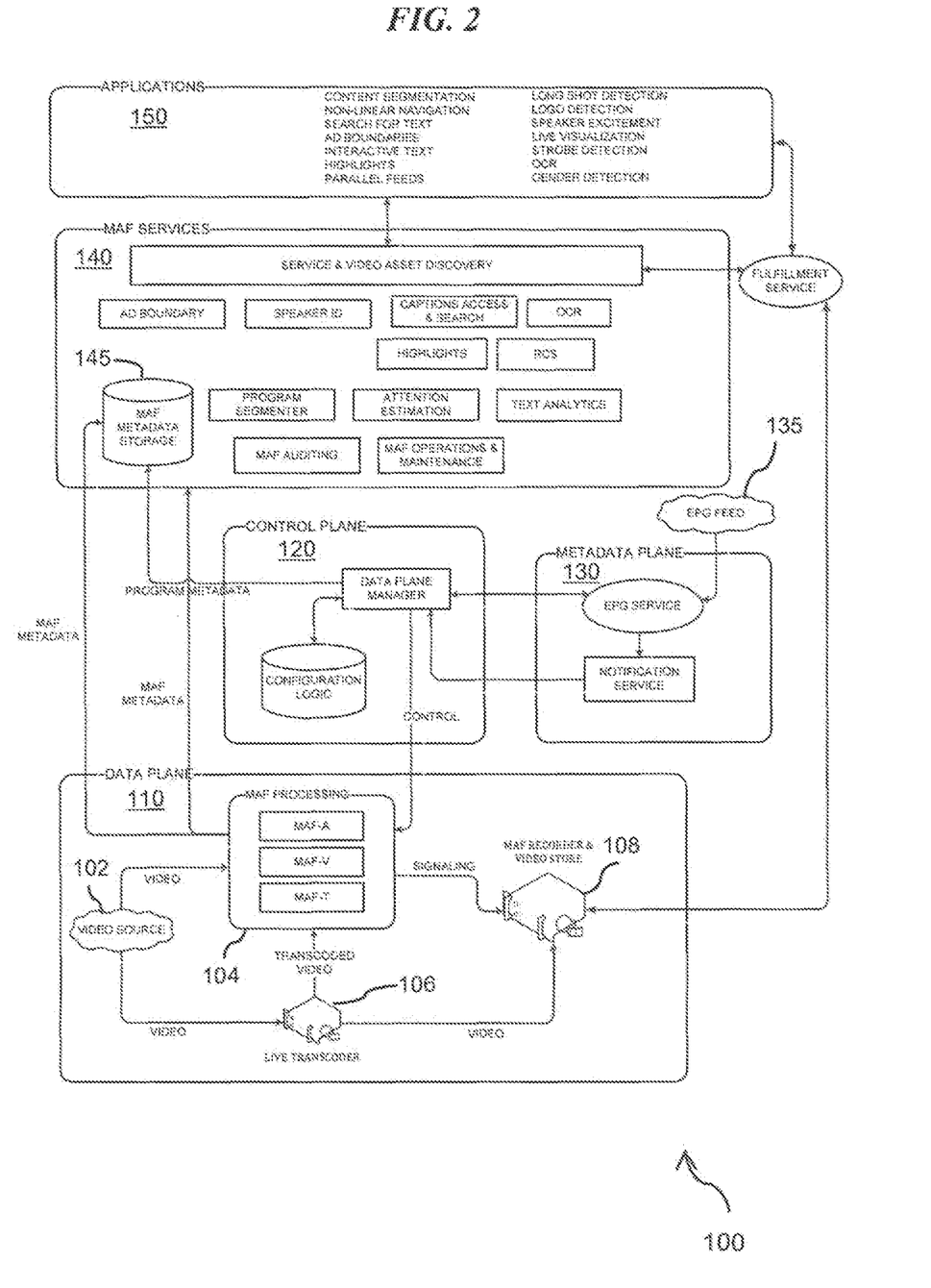
FIG. 2 depicts an illustrative architecture for a media analysis framework according to an embodiment.

An illustrative embodiment comprises a data plane 110 that is able, for example, to receive, e.g., from a video source 102 or from a transcoder 106, an audiovisual content signal which comprises at least one of audio, visual, and textual content. In addition, the data plane 110 may receive a timing indication to signify the beginning and end of independent audiovisual assets transmitted over the audiovisual content signal and may transcode (e.g., in transcoder 106) the audiovisual content signal into different formats and bitrates. The data plane 110 may also record the audiovisual content signal using the start and end (or duration) times into a content storage system (e.g., MAF recorder and video store 108) and return a unique identifier to index each identifiable segment of the audiovisual content for future reference. The data plane 110 may also include start and stop feature detectors on demand to annotate time-indexed audiovisual samples constituting an audiovisual asset and may perform, e.g., in one or more processors of a processing module 104, audio analysis (MAF-A), visual analysis (MAF-V), and text analysis (MAF-T) on each audiovisual asset at the time of ingestion or at a later scheduled time. Finally, the data plane 110 may store the results of the analysis of each audiovisual asset, e.g., in a service plane database 145 indexed by the unique identifier.

The metadata plane 130 shown in FIG. 1 may be configured to receive, e.g., from an electronic program guide ("EPG") feed 135, EPG information or other audiovisual content-related information. The metadata plane 130 may also be configured to periodically query the electronic program guide 135 or other audiovisual content-related information and produce (e.g., in a notification service) events to notify the control plane 120 of upcoming reception of audiovisual assets over the incoming audiovisual content signal into the data plane.

The control plane 120 shown in FIG. 1 may host recording and analysis configuration parameters, e.g., in a configuration logic database, manage (e.g., in a data plane manager) queues of audiovisual asset recording commands (including schedule, prioritize, distribute, cancel) based on the inputs of the notification service provided by the metadata plane 130, and record configuration parameters. In addition, the control plane 120 may be configured to signal data plane feature detectors to start and stop the analysis of audiovisual assets based on analysis configuration parameters and in return obtains domain-specific descriptors associated with an audiovisual asset identifier. In addition, the control plane 120 may fetch additional metadata for the recorded and analyzed asset by querying the electronic program guide service in the metadata plane 130 and store the asset identifier and additional EPG metadata or other audiovisual content-related information in a service plane database 145.

The service plane 140 shown in FIG. 1 may store (e.g., in a service plane database 145) the audio, visual, and textual features as well as additional electronic program guide metadata of audiovisual assets or other audiovisual content-related information based on their unique identifier and host modules that perform specific analysis on each asset's audio, visual, and textual features either at the time of capture or at a later specified time. In addition, the service plane 140 may make available the result of the feature analysis modules for use by other feature analysis modules or by software modules in the application layer 150 and host a service interface module to act as intermediary between the application plane 150 and the service plane 140, capable of returning a list of audiovisual assets corresponding to the result set of combined queries across one or more detector features formulated by an application plane module. The service plane 140 may also allow the monitoring, configuration, and control of the feature analysis detectors in the data plane 110 through an operator-level application of a service provider, e.g., a dashboard-type interface, or other interface with similar functionality and audit the operation of the feature analysis detectors in the data plane 110 and provide (e.g., to an operator-level application of a service provider) a dashboard-type interface, or other interface providing statistics and operational parameters.

The application interface plane 150 that allows a user to formulate a query indicative of entry points of interest within an asset catalog, e.g., where, based on user selection, such an asset catalog can be composed of all assets ingested or a subset of assets ingested, and/or where such a subset of assets ingested may correspond to only assets previously watched by user (i.e., only assets into which a set-top box (STB) associated with the user was tuned). In an embodiment, application interface plane 150 may use HTML5.

Application interface plane 150, in an illustrative embodiment, may be able to process a query made in one or more of the following forms: text indicating words or sentences present in the audio or textual portions an audiovisual asset; text indicating words or sentences present in visual form in the audiovisual asset; an audio query from a particular speaker being searched; an audio query from a particular type sound (e.g. explosion, sneeze, etc.) being searched; an audio query from a particular song; an audio query where such audio query is input through a microphone or audio file; a visual query from a particular person being searched; a visual query from a particular object or scene being searched; a visual query where such visual query is input through an audiovisual signal from a camera or other audiovisual source, or video file; or a choice of any of the above plus a detector source (e.g., text from OCR, text from captioning data).

Application interface plane 150 may also be configured to store the queries and use them to improve or otherwise modify indexing of the repository, which may occur in real time, optionally collect information regarding the assets watched by a user, allow the user to playback or otherwise manipulate selected assets from the result set at indexing points of interest, and present the embedded audiovisual content and analyzed information received from the service plane 140 in response to combined queries across one or more detector features or service modules in a way that defines a unique user experience (e.g., content segmentation, search for text, interactive text, parallel feed, ad boundaries, highlights, etc.).

The application interface plane 150 may further be configured to optionally define an order for the presentation of the embedded audiovisual content. Such order may be based on at least one of the audio, visual, or textual features extracted from the audiovisual content, information collected regarding previous assets watched by a user; and audio and visual features extracted from audio and video captures from the user at previous times in which user was watching audiovisual content. Such features may be extracted, for example, through microphones and cameras located at the user's premises.

An illustrative embodiment may allow the data plane 110, control plane 120, metadata plane 130, and service plane 140 to be locally hosted for each deployment, or allow any deployment configuration capable of hosting the aforementioned planes as shared services to serve multiple tenants concurrently.

Embodiments of systems, methods, apparatus, and architectures in accordance with some or all the foregoing illustrative examples are able to provide a media analysis framework 100 suitable for practicing aspects of the present disclosure set forth below.

Creating Derivative Advertisements

Embodiments of a system and method for creating derivative advertisements may utilize the above referenced Media Analysis Framework (MAF) or media analyzer 100 for purposes of analyzing one or more primary advertisements or assets and generating a secondary, derivative, advertisement or asset therefrom. As an example, this derivative asset may be used as a second screen advertisement in system 10 discussed above or in other advertisement systems or schemes.

By way of example, the primary or original advertisement may be a television commercial having video and audio content and being of a duration of about 30 seconds or some other shorter or longer duration. In some circumstances, an advertiser may find it useful to produce a secondary advertisement that is a derivative of the primary advertisement and supplements the primary advertisement. The secondary derivative advertisement may be shorter in duration and/or different in presentation in some manner as the primary advertisement and may be provided for display on a client device different from that of the primary advertisement. For instance, while the primary advertisement may be intended for delivery and display on a television during a television broadcast, the secondary derivative advertisement may be intended for delivery and display on a tablet, smartphone or like client device. However, although different in form in some aspects, the secondary derivative advertisement should provide the same or similar overall branding message or a message consistent with the branding message as provided in the primary advertisement.

Accordingly, the secondary derivative advertisement may contain: (a) one or more derivative visual elements; and (b) one or more Call to Action (CTA) metadata elements. The visual element may be an image or images, a video clip, or the like that is representative in some manner to the branding message of the primary advertisement. The CTA metadata element should enable an end user to interact in same manner with the advertiser or advertisement via use of a client device, such as a tablet, laptop computer or smart phone such as by providing consumer feedback, responding to a question, taking a survey, subscribing to or entering a promotional event, obtaining additional information concerning the advertisement or products or services disclosed therein, or the like. The creation of the second screen advertisement (i.e., derivative advertisement) and the above referenced visual element and CTA data element may be accomplished automatically by the media analyzer 100 or some other external electronic device, processing unit, or software product based on electronic computer processing of the original, primary advertisement.

By way of example, the above described MAF 100 may be used to analyze at least one or all of the elementary audio, video, and text streams of the primary advertisement or asset and generate metadata therefrom. Here, one or more audio, video and/or text algorithms are applied to the primary advertisement or asset to automatically generate metadata from which a second, derivative, multimedia asset may be created that conveys the branding message of the primary advertisement or asset. For instance, an image or short video clip from video content which best conveys the branding message may be selected for the secondary derivative advertisement. The image may be a key video frame or frames identified and extracted from the video stream.

It is also possible for the metadata created by the algorithms to be augmented by application of additional external and/or internal metadata. For instance, such additional metadata may be obtained from external sources, from user feedback, or the like. Thus, the MAF-created metadata which may be augmented with additional metadata is then used to automatically create the visual (or audio/visual) content of the secondary derivative advertisement or asset. Thus, while the primary advertisement, such as a video segment, may be shown on an end user's primary screen, such as a widescreen television, one or more visual elements of the secondary derivative advertisement or asset may be simultaneously displayed on the end user's secondary client device, such as a tablet, smartphone, or the like. Alternatively, the secondary derivative advertisement may be shown not in conjunction with the primary advertisement.

In addition to the visual element of the secondary derivative advertisement, the metadata may also be used to automatically generate the CTA data element to be presented to an end user with the visual element for purposes of attempting to receive user engagement, interaction, or feedback via the end user's secondary device or for enabling some form of interaction between the end user and the advertiser based on the advertisement.

Still further, the system and method for creating the secondary (derivative) advertisement or asset may not only link the visual element, CTA data element, and possibly additional (optional) metadata concerning the subject matter or branding message of the primary advertisement or like asset, it may also be capable of automatically modifying the characteristics of the secondary advertisement based on the end user's specific client device characteristics such as screen resolution, app (e.g., application used for displaying or rendering the secondary advertisement), and capabilities (e.g., device capabilities). In this manner, customization of appropriately formatted secondary advertisements can be properly consumed by a population of end users having different client devices with differing capabilities which also may differ significantly from primary screens utilized to display the primary advertisement.

Figure 3:
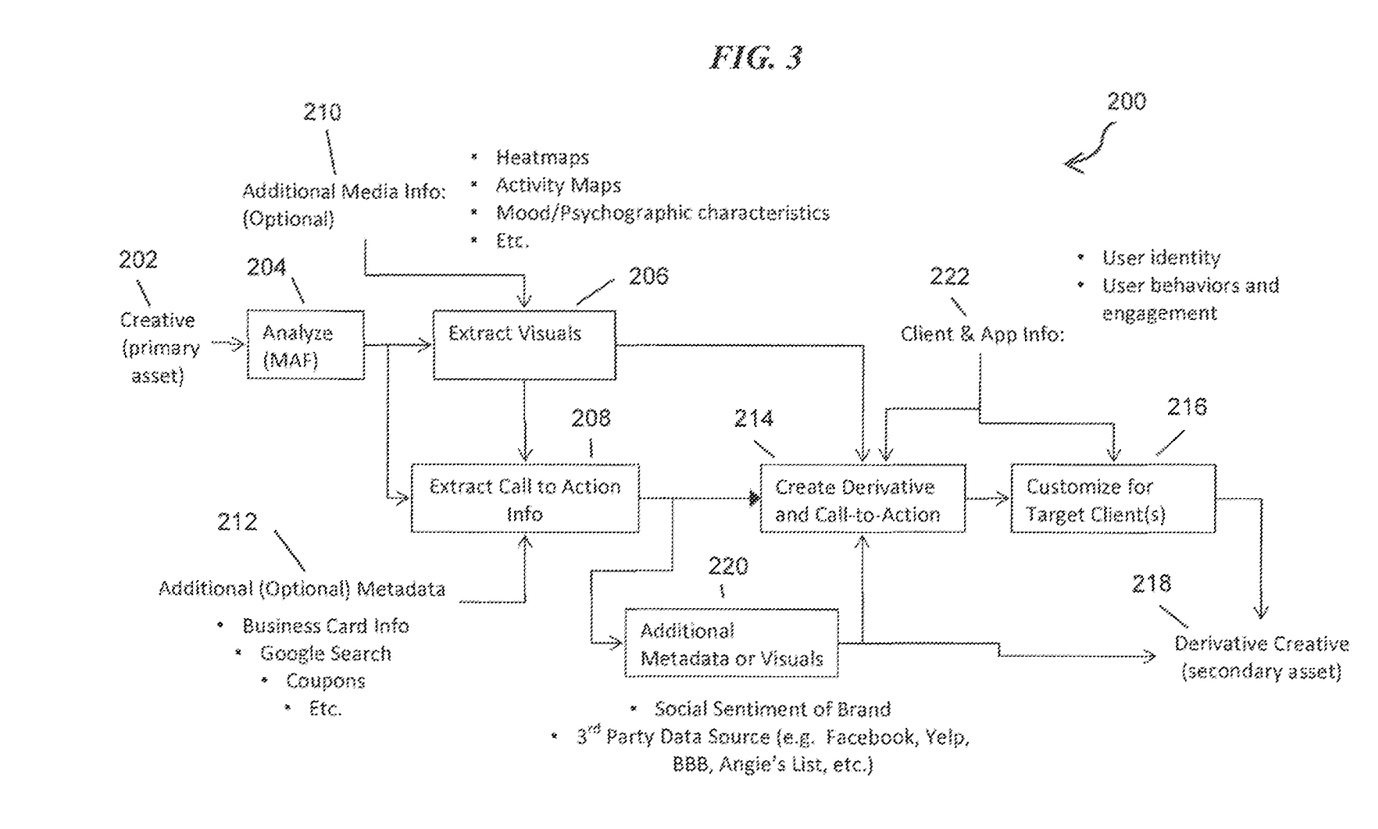
FIG. 3 depicts an illustrative embodiment of a system for creating derivative advertisements for use as second screen advertisements according to an embodiment.

FIG. 3 depicts an illustrative embodiment of a flowchart of a system or method 200 for automatically creating and generating the above referenced secondary derivative advertisements from primary advertisements. As shown in FIG. 3, a primary asset 202, such as a primary advertisement, may be input into and ingested by the MAF 100 discussed above or like media analyzer for purposes of analyzing 204 the primary asset and subjecting one or more of the audio, video and text streams of the primary asset to desired algorithms. As discussed above, the primary advertisement may be a television commercial or some other video advertisement. As a result of such analysis 204, one or more visual elements 206 and one or more CTA data elements 208 may be extracted or generated that best convey the branding message of the primary asset and that request end user engagement, feedback, interaction, or the like related to the branding message, advertiser, or advertisement.

The visual elements 206 may be based solely on the analysis 204 of the primary asset or may be selected, augmented, or altered based on externally obtained media information 210, such as from user feedback, heatmaps, activity maps, mood or psychographic characteristics, user reviews, logos, and the like. Likewise, the CTA data elements 208 may be based solely on the analysis 204 of the primary asset or may be selected, augmented, or altered based on externally obtained metadata 212 such as business card information, information obtained based on Internet searches, information available on web sites, available coupon or sales information, and like information.

By way of example, the CTA data element may be extracted from the primary advertisement and relate to content within the primary advertisement. For instance, for a 30-second TV commercial that forms a primary advertisement, the MAF-V processing in the media analyzer 100 may detect on-screen text displayed within the primary advertisement. Further analysis may recognize the text as a telephone number or some other address or information concerning the advertiser, product or services being advertised, or advertisement in general. Thus, the step 206 of extracting the visual element may include extracting the frame of video containing the telephone number or other information. Further, step 206 of extracting the CTA data element may convert the telephone number appearing in the video frame into a clickable link which is presented to the end user via the secondary advertisement displayed on the end user client device. Thus, when the derivative advertisement is created in step 214, the end user is able to click on the image of the telephone number to generate a call to the number. Alternatively (and if the device is not a smartphone) the device may save the number for the user to call later.

Of course, a telephone number or clickable link to a telephone number provides only one example of a CTA data element. For instance, the CTA data element may include recognition of web addresses (URLs) displayed in a video, which can be provided in the secondary advertisement and clicked and visited by the end user. The CTA data element may also be URIs that can include app invocation and the like (e.g., a vendor can have their derivative ad include a link to their application on a site where apps are sold or the like).

In addition, the media analyzer may detect via MAF-A processing spoken telephone numbers, addresses, or other information which may be converted to a CTA data element.

Information for augmenting the CTA data element may be provided in step 212 for a primary advertisement (by the producer of the ad), or could be otherwise obtained in step

220 via external sources discussed below. Information obtained in step 212 may include phone numbers, addresses, email and web site addresses, coupons, and the like. Such information may permit a CTA data element to be created even if the required information is not necessarily contained within the audio or video of the primary advertisement. For example, the business address of the advertiser may not be displayed on screen within the video of the primary advertisement; however, a CTA data element could be created, for instance, to display the business location on a map upon clicking a link provided in the secondary advertisement. Further, a CTA data element could involve displaying or providing a clickable link to a coupon that may not necessarily be displayed in the primary advertisement.

The visual elements 206 and CTA data elements 208 generated are used to create a secondary derivative asset or advertisement 218 in step 214 which may or may not be subject to customization in step 216 to produce a secondary derivative asset 218 particularly adapted for the desired audience, end user, or end user client device.

Additional metadata or visuals 220 may be added into the secondary derivative from third party data sources or social sentiments of the brand in the advertisement. These further metadata and visuals may be obtained in step 220 by utilizing the extracted visual and CTA data element in steps 204, 206 and 208 and metadata obtained in step 212. For example, given a business name, phone number, or address, information from third party data sources may be obtained (for example, from an associated web page that is associated with the name, phone number, or address, such as a Facebook page or Yelp page for a business). A CTA data element may be created that directs the end user to the associated web page upon clicking on the CTA data element provided in the derivative advertisement. Additionally, visual information from third party sources (e.g., photos from the associated web page) may be incorporated into the derivative advertisement in addition to (or in place of) visuals extracted during step 206 from the primary advertisement.

As another example in which additional metadata or visuals 220 may be added into the secondary derivative from third party data sources, information about reviews and ratings obtained from third party data sources, such as Facebook, Yelp, Google, Amazon or like sources may be added to the derivative creative 218. For instance, the derivative creative 218 for an advertisement of a restaurant may include information from Yelp or like third party source that the restaurant has an average of 4.5 out of 5 rating.

Further, when creating and customizing the secondary derivative asset or advertisement, end user client device characteristics and app information 222 such as user identity, user behavior and engagement may be used in the customization of the derivative secondary asset or advertisement for a particular end user or group of end users.

In an illustrative example, embodiments of system 200 can be used by cable television or like multi-service operators for offering services of creating second screen advertisements automatically based on analysis of original, primary (e.g., local) advertisements 202, such as television commercials or the like. Such services may lower costs to advertisers who are seeking to advertise on second screens while not having to pay a creative agency for separately creating a second-screen-only advertisement 218. Such advertisements enable the primary advertisement 202 to be viewed on a television or other primary screen of an end user while the secondary derivative advertisement 218 is simultaneously displayed or made available on the end user's smartphone, tablet or like secondary client device having a secondary display screen which enables the end client to interact with the CTA data elements and possibly provide feedback or other information or gain access to additional related information.

Embodiments may allow the system and method 200 to alter the derivative asset 218 based on information received from/about interactions and engagement with the derivative asset 218 on the secondary client device. In one illustrative example, if only few or no end users engage, interact or respond to the CTA data element of the derivative asset 218 over a period of time or within a particular geographic location, then the system 200 may be configured to automatically generate an alternate derivative asset that has different visuals and/or CTAs. This allows dynamic derivative assets to be created and tested over periods of time that may lead to greater variety of secondary advertisements and may be more effective in obtaining user engagement.

In the above embodiments, the CTA data elements 208 in the secondary asset 218 may be presented in a closed form (i.e., a single choice to click-through), in a semi-closed form (i.e., choices of ads to click through), or in an open form (i.e., user interaction with video to generate CTA). The user engagement feedback can further consider what ads receive attention and what do not in semi-closed form or what parts of an ad receive the most attention in the open form.

In another alternative embodiment, the secondary derivative advertisement may also contain derivative audio such that the derivative advertisement contains: (a) derivative visual(s), (b) derivative audio, and (c) a Call to Action (CTA) metadata. In an illustrative example according to this alternative embodiment, the derivative audio may be generated by extracting music (or portions thereof) or jingles from the primary advertisement detected by music/audio detectors in the MAF or media analyzer 100. More generally, the derivative audio may contain any audio portion of the primary advertisement; for instance, the voice of an actor speaking the business slogan in the primary advertisement can be extracted and added to the secondary derivative advertisement.

In still another alternate embodiment, a CTA, such as a phone number, email address or website, may be extracted by the MAF 100 from the audio via speech-to-text techniques.

A further alternate embodiment may provide features of a second screen application, for example, by performing the steps of: ingesting a set of candidate first screen ad assets; generating a plurality of CTA elements, at least one per candidate ad asset; generating a plurality of second-screen ad assets; responsive to a second screen campaign manager, processing the multiplicity of generated CTA elements to obtain a set of selected CTA elements; and instrumenting a second screen application responsive to the selected CTA elements and corresponding second-screen ad assets.

In another alternate embodiment, the generation of the second-screen ad assets is responsive to campaign information. During the creative process, the campaign information is used to control parameters of the secondary derivative advertisement generation process, such as the derivative ad length, targeting information, media type, device type, set of viable resolutions, dimensions of the ad as a result of the targeted app or apps, and other characteristics. Here, there is the actual business-related parameters of the campaign specific to the planned second-screen campaign extension (e.g. desired duration, targeting information, media type, etc.) as well as parameters obtained as a result of some of these parameters, (e.g. targeting information→devices→set of viable resolutions, dimensions of the ad as a result of the targeted app or apps, and the like).

In another alternate embodiment, generation of the second-screen ad asset may be generated responsive to previously generated CTA elements and ad assets. If matched to the same brand/product, the characteristics and content of the generated second screen ad assets and CTA elements can be augmented using information, graphics, URLS, etc. obtained from previously generated ad assets and CTA elements.

Accordingly, in any of the above embodiments, a system and method may include applying at least one audio, video, and text algorithms to a first asset to generate a second, derivative, multimedia asset that conveys the branding message of the first asset and is augmented with a derived Call-to-Action created using analysis of the first asset, and adapted to the delivery requirements of the device receiving the derivative asset. Further embodiments comprise a system and method which, for example, may include the steps of ingesting a first advertisement asset; performing an audio, visual, and/or textual analysis on the asset; generating one or more types of derivative visual elements and one or more Call to Actions (CTA) data elements; and generating metadata from the analysis and CTA.

Embodiments optionally collect additional metadata, visuals, text, or audio from external sources (e.g. user reviews, logos), and optionally collect user engagement feedback. Embodiments generate one or more derivative creative or asset using the generated and/or collected metadata and user feedback. For instance, with respect to user engagement, a feedback loop can be utilized to enable refinement of the secondary derivative advertisement or components thereof. Thus, user engagement, analytics and other metadata can contribute to the creation and subsequent refinement of the derived second-screen asset.

By way of example, if a derivative video-based second-screen ad is created from a 30 second television commercial and, as created, has a duration of about 10 seconds, the system could refine the second screen ad to have a different length based on analytics gathered via feedback. For instance, if the analytics gathered indicates that most end user only consume about 4 to 6 seconds of the second-screen ad, the system could refine the second screen asset to be of a shorter length. Of course, such refinement based on feedback can also be used to modify the CTA data element, the visual element, and other components, aspects, or characteristics of the secondary derivative advertisement.

Thus, an example of yet another embodiment takes input video content and creates derivative content from the original and using input metadata (extracted or provided), augmenting with externally gathered value (rating/reviews, etc.), and reacts to user interaction (feedback) as discussed above. Embodiments are thus able to derive content. Further embodiments are able to repurpose content, to support alternative placements. Further embodiments are able to alter a derivative advertisement or CTA based upon interactions with users.

In an illustrative example, an embodiment automatically creates a derivative ad from a primary piece of content, using a media analysis framework such as the MAF described herein, to intelligently select one or more key frames. The key frames are used to create a secondary ad comprising visual elements, a CTA, and (optionally) selected metadata from the primary content.

In one embodiment, key frames extraction is achieved by ranking frames by means of their visual feature frequency. First, visual features are extracted from every frame in the primary or original advertisement. One example of such visual features is the MPEG-7 ColorLayout, which consists of 12 coefficients capturing the spatial color distribution across a frame. Another example of visual features is color histogram. Once the visual features generated for all the frames in an advertisement, a histogram can be created for every component of the visual feature. For example, with ColorLayout, there will be 12 histograms, one for each component of the ColorLayout. For any frame at the original advertisement, a list of frequencies of its visual feature components can be generated by plugging the visual feature component values to their corresponding histograms. Collectively, the frequencies of all components for a frame determine the frequency of a frame. One way to generate a single numerical measure of frequency for a frame is to take the squared sum of its feature component frequencies. One method of selecting the key frames is to rank all frames by their frequency in descending order, and pick the top N as the key frames.

In another embodiment, the primary or original advertisement is partitioned into a number of shots, where each shot represents a scene such that its visual content is different from the neighbor shots. For each shot, a representative frame is extracted. Different criterions can be applied when extracting a representative frame within a shot. For example, extract visual features for all frames within a shot and select the most frequent; or extract the one that has most crisp foreground details; or the one have most on-screen text information; or the one with least moving content with respect to neighbor frames.

As another illustrative example in which audio content is also extracted from the primary advertisement, the media analysis framework may obtain audio features from the primary piece of content to help determine when music is playing. An example of such audio features are: Spectral Flux of audio segments, Audio Spectrum Centroid, Spectral Centroid, Audio Spectrum Flatness, Harmonic Ratio, Harmonic Spectral Centroid, Spectral Rolloff Frequency, Mel Frequency Cepstrum Coefficients and its deltas, variation if zero-crossing rates, and variations in short-time energy of audio segments. The statistics of such features during portions of the audio containing music are usually different than the statistics of such features during portions of the audio containing information other than music. Thus, the system would extract the portions of audio from the primary piece of content that have statistics that match the expected statistics of music portions. Similarly, features such as statistics of Mel Frequency Cepstrum Coefficients can be used to recognize speakers and use them in the derivative creative content.

An operator, using an embodiment (e.g., at a server, at a headend of a network), is able to dynamically alter a derivative ad based on history/reports of interactions on the clients. In further embodiments, based upon such history or reports of user interaction, an operator may change the manner in which it targets particular end users. For example, reports may indicate that people act more often (in response to a CTA) when rating information is displayed in the upper-left corner rather than elsewhere. Over time, such embodiments allow an operator to obtain a more useful understanding of an individual's interactions.

Further embodiments provide intelligent key frame selection, and create a secondary ad linking visual, CTA, and (optionally) metadata. Embodiments are able to maintain, for example, branding and/or marketing features of the primary asset in the derivative asset. In some embodiments, the CTA can be either extracted, or expressly provided by an operator.

The above referenced devices for carrying out the above methods can physically be provided on a circuit board or within another electronic device and can include various processors, microprocessors, controllers, chips, disk drives, and the like. It will be apparent to one of ordinary skill in the art that the modules, processors, controllers, units, and the like may be implemented as electronic components, software, hardware or a combination of hardware and software. Some embodiments provide the interactive user interface discussed above on a mobile device, smartphone, tablet computer, laptop or desktop computer, or other type of computing or processing device. While some devices and processors may be described or depicted herein as separate entities, the functions may be combined into fewer or greater number of physical entities.

Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

While the principles of the invention have been described above in connection with specific devices, apparatus, systems, and methods, it is to be clearly understood that this description is made only by way of example and not as limitation. One of ordinary skill in the art will appreciate that various modifications and changes can be made without departing from the scope of the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for creating derivative advertisements, comprising:
   in at least one electronic media analyzer, performing steps of:
      automatically identifying a visual element of a primary advertisement asset comprising audiovisual digital content, the visual element being representative of a branding message provided within the primary advertisement asset and the primary advertisement asset for displaying on a primary viewing screen of a first type of end user client device, wherein the identifying is based at least on a media analysis that comprises an analysis of audio, video, and text streams of the primary advertisement asset;
      automatically identifying a call-to-action (CTA) data element based on the media analysis; and
      automatically creating a derivative advertisement asset having the visual element and CTA data element, the derivative advertisement asset for displaying on a secondary viewing screen of a second type of end user client device, wherein the first type of end user client device is different from the second type of end user client device.

2. A method according to claim 1, wherein said steps of identifying the visual element and CTA data element and said step of creating the derivative advertisement are performed automatically by the at least one electronic media analyzer upon ingesting at least one of audio, video and text streams of the primary advertisement asset.

3. A method according to claim 1, further comprising the step of:
   analyzing at least one of audio, video and text streams of the primary advertisement asset with the at least one electronic media analyzer to perform the media analysis and to generate metadata concerning the branding message provided within the primary advertisement asset;
   wherein said steps of identifying the visual element and CTA data element include use of the metadata by the at least one electronic media analyzer to identify the visual element and CTA data element.

4. The method according to claim 3, wherein, during said analyzing step, an audio portion within the audio of the primary advertisement asset is identified with the at least one electronic media analyzer, and wherein said step of creating the derivative advertisement asset includes use of the identified audio portion as audio in the derivative advertisement asset.

5. The method according to claim 3, further comprising the step of collecting additional metadata from a source and supplementing the metadata generated during said analyzing step with the additional metadata for use in creating the derivative advertisement asset.

6. The method according to claim 1, further comprising the steps of:
   obtaining at least one of campaign information, targeting information, media type information, end user client device type information, resolution and dimension capabilities information, end user client device capabilities information, and software application capabilities information for a targeted audience to which the derivative advertisement asset is to be delivered; and
   modifying characteristics of the derivative advertisement asset based on the at least one of campaign information, targeting information, media type information, end user client device type information, resolution and dimension capabilities information, end user client device capabilities information, and software application capabilities information to adapt delivery of the derivative advertisement asset to the second type of end user client device.

7. The method according to claim 6, further comprising the step of delivering the primary advertisement asset and the derivative advertisement asset to an end user for playing of the primary advertisement on the primary viewing screen of the first type of end user client device and displaying of the derivative advertisement asset on the secondary viewing screen of the second type of end user client device.

8. The method according to claim 1, further comprising the step of collecting user feedback via user engagement with the CTA data element of the derivative advertisement asset.

9. The method according to claim 8, further comprising the step of modifying the derivative advertisement asset based on at least one of user feedback, user engagement with the CTA data element, and analytics concerning user engagement with the derivative advertisement asset.

10. The method according to claim 9, wherein said step of modifying the derivative advertisement asset includes changing at least one of the visual element, the CTA data element, and a duration of the derivative advertisement asset.

11. The method according to claim 8, further comprising the step of automatically modifying the derivative advertisement asset after a predetermined period of time lapses without achieving a pre-determined amount of user engagement with the CTA data element.

12. The method according to claim 1, further comprising the step of collecting from one or more sources external to a source of the primary advertisement asset, at least one of an additional visual, additional text, and additional audio for use in creating the derivative advertisement asset.

13. The method according to claim 12, wherein the additional text comprises at least one of user reviews, a telephone number, a business address, an email address, a web site address, a URL, and a URI.

14. The method according to claim 12, wherein the additional visual comprises at least one of a logo, a photograph, or an image.

15. The method according to claim 1, wherein identifying the CTA data element includes converting speech contained in audio of the primary advertisement asset of at least one of a phone number, address, e-mail address, and web site to text via speech-to-text analysis.

16. The method according to claim 1, wherein the CTA data element is in a form permitting interaction with the secondary advertisement asset including at least one of a single choice to click, multiple choices to click, or interaction with video.

17. A non-transitory computer-readable storage medium comprising stored instructions which, when executed by at least one computer processor, cause the at least one processor to perform the method of claim 1.

18. A non-transitory computer-readable storage medium comprising stored instructions which, when executed by at least one computer processor, cause the at least one processor to perform the following operations:
generating a media analysis by analyzing at least one of audio, video and text streams of a primary advertisement asset comprising audiovisual digital content, wherein the media analysis comprises metadata concerning a branding message provided within the primary advertisement asset, the primary advertisement asset for displaying on a primary viewing screen of a first type of end user client device;
automatically identifying, based on the media analysis, a visual element that is representative of the branding message based on information contained within the metadata;
automatically identifying a call-to-action (CTA) data element based on the information contained within the metadata; and
automatically creating a derivative advertisement asset having the visual element and CTA data element, the derivative advertisement asset for displaying on a secondary viewing screen of a second type of end user client device, wherein the first type of end user client device is different from the second type of end user client device.

19. A system for creating derivative advertisements, comprising at least one computer processor configured to:
automatically identify a visual element based on a media analysis that comprises an analysis of at least one of audio, video and text streams of a primary advertisement asset,
wherein the primary advertisement asset comprises audiovisual digital content concerning a branding message, the visual element being representative of the branding message, the primary advertisement asset for displaying on a primary viewing screen of a first type of end user client device;
automatically identify a call-to-action (CTA) data element based on the analysis; and
automatically create a derivative advertisement asset having the visual element and CTA data element, the derivative advertisement asset for displaying on a secondary viewing screen of a second type of end user client device, wherein the first type of end user client device is different from the second type of end user client device.

* * * * *